Patented Apr. 30, 1935

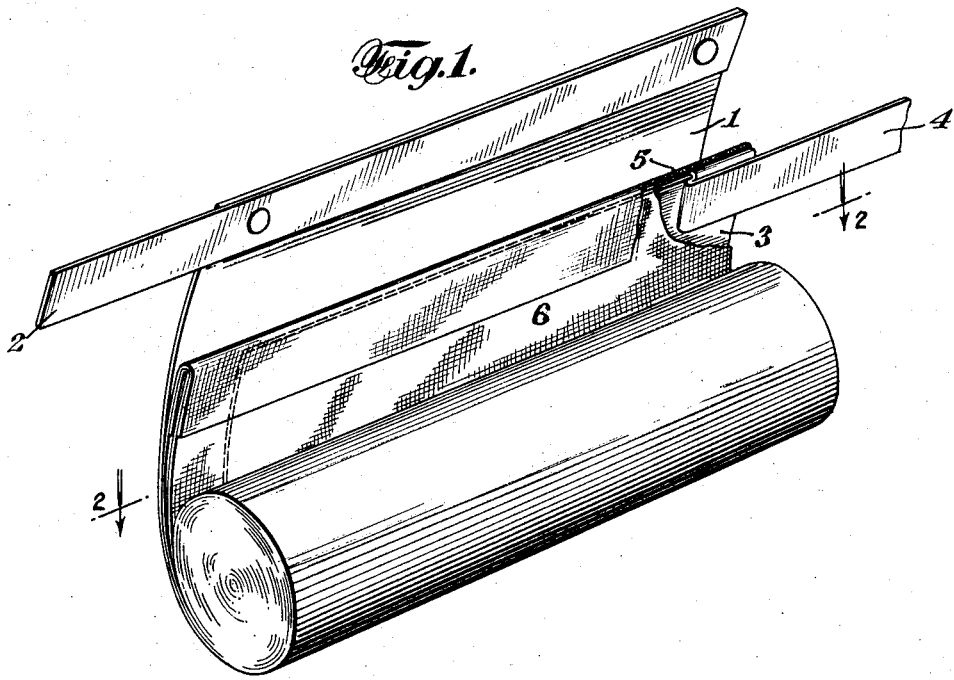
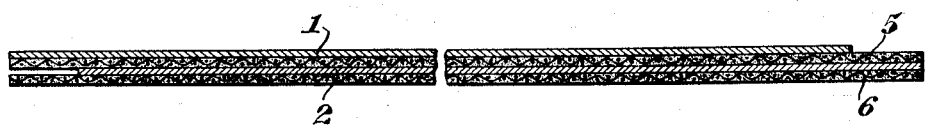

1,999,373

UNITED STATES PATENT OFFICE 1,999,373

ELECTROLYTIC CONDENSER

Herman Lee Sklar, Coney Island, N. Y., assignor to Micamold Radio Corporation, Brooklyn, N. Y., a corporation of New York Application September 30, 1932, Serial No. 635,610

1 Claim. (Cl. 175—315)

This invention relates to condensers of the type wherein a dry electrolytic film is maintained on the surface of armatures or electrodes such as aluminum and employing an electrolyte in solid or nearly solid form.

I have discovered that the characteristics of the condenser are greatly improved if a colloid such as the colloidal earth bentonite is incorporated with the electrolyte. I have found that such a colloid serves as a plasticizer for the electrolyte, that is it changes the electrolyte into a plastic material. It also serves to stabilize the condenser so that it retains for a considerably longer period the characteristics present when first manufactured. I have found further that such material maintains the mass of electrolyte in a somewhat moist condition, thereby assuring the effective functioning of the condenser throughout its life.

For example, the electrolyte may be made up by mixing the following ingredients in the proportions indicated by weight:—

| | Parts by weight |
|---|---|
| Ammonium borate | 8.33 |
| Glycerine | 5.58 |
| Bentonite | .05 |

The ammonium borate and glycerine are first mixed together and heated to a temperature of approximately 60 degrees C. The bentonite is then added and the heating is continued to about 125 degrees C. This electrolyte as so prepared is employed in pasting the condensers in a manner well known to the art while the electrolyte is still hot. Or it may be allowed to cool and put aside for future use. It is reheated again when subsequently used to a suitable temperature for pasting. The condensers so pasted may be formed in a manner well known to the art, that is, by applying a high voltage to the condenser terminals in series with a high resistance.

Although in the above example I have specifically described an electrolyte prepared using certain proportions of materials by weight I do not desire to be limited to such proportions as they may be varied to obtain condensers of correspondingly varying characteristics.

In addition, although I have described the use of ammonium borate and glycerine with a colloidal earth it is to be understood that I may employ other materials than ammonium borate and glycerine with bentonite or like material. It is feasible to prepare other electrolytes or thick liquids containing bentonite with a weak acid which would be likewise suitable, for example I may employ glycoboric and glyceroboric acid with bentonite. Bentonite is a plasticizing colloidal material.

I have found that condensers so prepared and formed give an unusually large capacity per square inch, and have an extremely low power factor. They have an extremely long shelf life. In addition I find that bentonite maintains a considerable proportion of moisture present in the electrolyte, thus keeping the electrolyte moist even at relatively high temperature. The particular importance of this characteristic is that the condenser thereby has "self-healing" characteristics. In other words if a break should occur from any cause in the oxide surface, the electrolyte due to its plasticity will be in a somewhat mobile or fluid condition, and can travel to and cover up the broken part of the surface, and by thus repairing the dielectric surface, leakage of current is avoided.

A preferred form of condenser employing the electrolyte above described is shown in the accompanying drawing wherein Fig. 1 is a perspective view of the condenser partially unrolled, and Fig. 2 is an enlarged cross-sectional view taken through the condenser along the line 2—2 of Fig. 1.

In the drawing, the numeral 1 designates one electrode with its terminal 2. The other electrode is designated by 3 with its terminal shown at 4. Between the electrodes are layers of gauze 5 and 6 impregnated with the electrolyte.

What I claim is:—

A process for forming an electrolyte which comprises mixing together ammonium borate and glycerine in suitable proportions to form an ammonium glycero borate, heating the mixture to about 60 degrees C., adding bentonite and heating the mixture to about 125 degrees C.

HERMAN LEE SKLAR.